United States Patent [19]
Noma et al.

[11] Patent Number: 5,660,473
[45] Date of Patent: Aug. 26, 1997

[54] THERMAL SENSOR

[75] Inventors: Shin Noma; Keiichi Takahisa, both of Tokyo, Japan

[73] Assignee: Nippon Thermostat Co., Ltd., Tokyo, Japan

[21] Appl. No.: 318,174

[22] Filed: Oct. 5, 1994

[30] Foreign Application Priority Data

Apr. 27, 1994 [JP] Japan ................................. 6-089502

[51] Int. Cl.$^6$ ................................................. G01K 1/08
[52] U.S. Cl. ........................................... 374/145; 374/208
[58] Field of Search ................................. 374/145, 147, 374/183, 208

[56] References Cited

U.S. PATENT DOCUMENTS

| | | | |
|---|---|---|---|
| 3,044,296 | 7/1962 | Boddy | 374/145 X |
| 4,164,220 | 8/1979 | Brickell et al. | 374/183 X |
| 4,299,117 | 11/1981 | Andrews et al. | 374/145 X |
| 4,587,931 | 5/1986 | Duprez | 374/145 X |
| 4,722,612 | 2/1988 | Junkert et al. | 374/208 X |
| 4,749,415 | 6/1988 | Barton | 374/208 X |
| 4,778,538 | 10/1988 | Lyman | 374/208 X |
| 4,841,274 | 6/1989 | Yagher, Jr. et al. | 374/208 X |
| 4,842,419 | 6/1989 | Nietert | 374/208 X |
| 4,991,976 | 2/1991 | Byles | 374/208 X |
| 5,048,974 | 9/1991 | Dupuy | 374/183 X |
| 5,224,778 | 7/1993 | Grossman et al. | 374/183 |

FOREIGN PATENT DOCUMENTS 6-7029  1/1994  Japan.

*Primary Examiner*—Elizabeth L. Dougherty
*Attorney, Agent, or Firm*—Longacre & White

[57] ABSTRACT

The present invention concerns a thermal sensor designed to house two thermistors in a metallic case to detect temperatures of a cooling water of engines.

The thermal sensor is composed of a metallic case in a tip portion of which the first thermistor is inserted thermally insulated from the second thermistor provided in a portion other than the tip portion thereof.

A plurality of uneven portions are provided on the outer surface of the tip portion of the metallic case to effectively radiate the heal generated by the second thermistor and substantially reduce a thermal interference against the first thermistor in the metallic case to give a sensitive response to a change in the temperature of the cooling water.

7 Claims, 5 Drawing Sheets

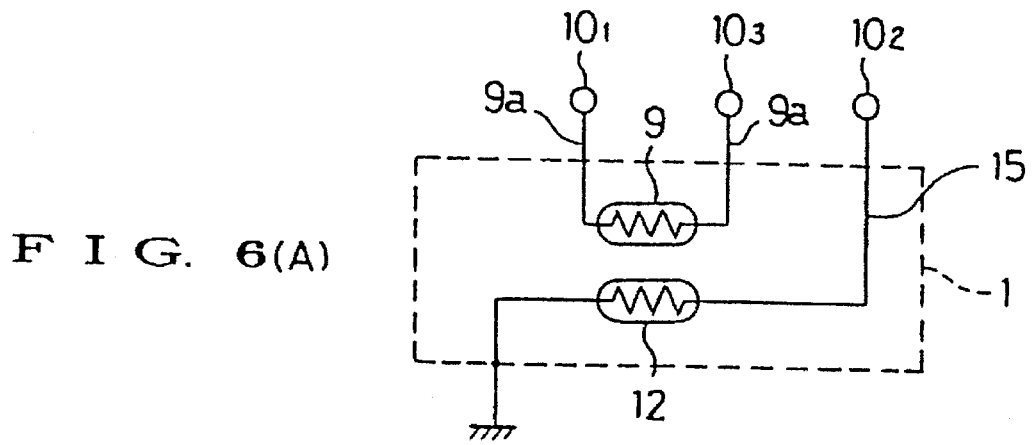
F I G. 6(A)
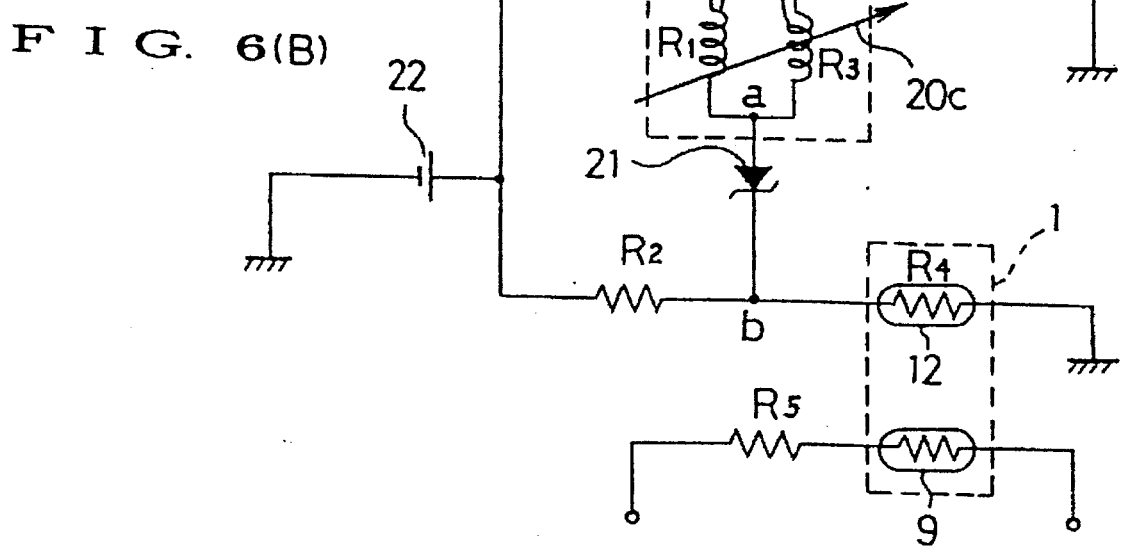
F I G. 6(B)
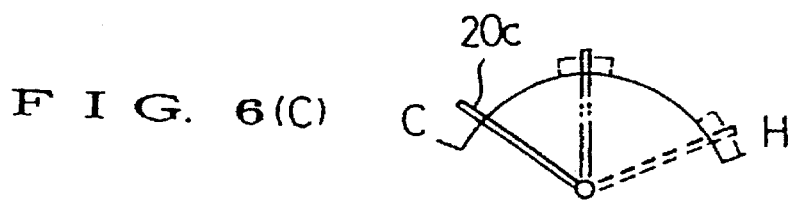
F I G. 6(C)

THERMAL SENSOR

BACKGROUND OF THE INVENTION a) Field of the Invention

The present invention relates to a thermal sensor to detect water temperatures of cooling systems of automobile engines, etc.

b) Description of the Prior Art

Generally, a conventional thermal sensor to detect the water temperature of a cooling system installed on an automobile engine is, as shown in FIG. 1, a thermal sensor 23 for an Electronic Control Unit (ECU) which regulates an engine system as to the fan motor, fuel injection, ignition time, idling revolution, etc. or a thermal sensor 24 to indicate water temperatures of a cooling water of an engine on a water thermometer mounted on a panel in front of the driver's seat.

The sensors 23 and 24 have a built-in thermistor of different properties respectively. The thermal sensors 23 and 24 both are to detect the temperature of the same cooling water and each thermal sensor is installed in the same cooling water circuit 25 separately. Further, there is such a thermal sensor as disclosed in Japanese Utility Model Application No. Hei 4-46882 (Laid Open Utility Model Application No. Hei 6-7029) filed by the applicant of the present invention and the thermal sensor is set forth hereunder.

The conventional thermal sensors shown in FIG. 1 have following disadvantages.

The sensor 23 for the ECU and the sensor 24 for the water thermometer are installed separately and two holes must be provided to install two thermal sensors on the cooling water circuit 25 of the engine separately.

This requires much works for the processing of the thermal sensors and installing thereof on the cooling water circuit.

Further, it is difficult to streamline a system composing two separate thermal sensors with regard to the size and to reduce the weight of the system.

In addition, the inventory and maintenance of two thermal sensors of different types are troublesome and costly.

The thermal sensor disclosed in the Utility Model Application No. Hei 4-46882 (Laid Open Utility Model Application No. Hei 6-7029) is in a metallic case in which two thermistors are installed, the one as a thermal sensor for a ECU and the other as a thermal sensor for a water thermometer which requires much electric current to swing a compass needle of the water thermometer. As a result, the latter thermistor itself generates a quantity of heat due to the electric current input and therefore a thermal insulation is provided between two thermistors to prevent a thermal interference caused by the heat against the former thermistor as the thermal sensor for the ECU.

However, still the thermal insulation alone is insufficient to substantially reduce the thermal interference against the thermistor as the thermal sensor for the ECU.

SUMMARY OF THE INVENTION

An objective of the present invention is to provide a thermal sensor as described with respect to FIGS. 2, 3, 4, 5 and 6 to reduce substantially the above disadvantages.

The thermal sensor is designed to enclose two thermistors in a metallic case. An electrically insulated holder made of electrically insulating materials such as plastics is provided to hold the first thermistor in a tip portion of the insulated holder and the second thermistor is provided in a portion other than the tip portion of the metallic case with which the insulated holder is coupled by inserting the tip portion of the insulated holder into the tip portion of the metallic case.

A plurality of uneven portions are formed on the outer surface of the tip portion of the metallic case. The uneven portions are formed on the outer surface of the metallic case vertically or spirally to the central axis thereof. The uneven portions are formed in a mono-block with the tip portion of the metallic case or formed on a separate metallic unit which couples with the tip portion of the metallic case. A sectional side shape of the uneven portions of the metallic case is a rectangular or a triangular. Alternatively, the first thermistor is provided in the tip portion of the insulated holder and is inserted into the tip portion of the metallic case and the second thermistor is provided in a portion other than the tip portion of the metallic case with a metallic unit formed in the shape of a coil which comes in contact with the outer surface of the tip portion of the metallic case. Preferably, the thermal sensor is comprised of a metallic case having a plurality of uneven portions or a metallic unit in the shape of a coil provided on the outer surface of the tip portion of a diameter smaller than that of the main body of the metallic case with a screw, for the installation of the thermal sensor of the present invention on a cooling water circuit, formed on an outer surface other than the tip portion of such a smaller diameter of the metallic case; an insulated holder to be mounted on a hollow portion of the base end of the metallic case; the first thermistor buried in the tip portion of the insulated holder and to be inserted into the tip portion of the metallic case; a lead wire of the first thermistor buried in the insulated holder the middle portion of which is coupled with a hollow portion at the middle of the metallic case; one electrode terminal partially buried in the base of the insulated holder and connected with the buried lead wire; an electrically conductive spring installed in an insulated sleeve to connect one end of the spring with the other electrode terminal; the second thermistor provided in the metallic case and connected with the other end of the electrically conductive spring by pushing so as to make an electrical and mechanical connection thereof; and an electrically insulated but thermally conductive material packed into the gaps between the first thermistor, the second thermistor and the electrically conductive spring.

The thermal sensor according to the present invention is constructed as described above so as to substantially reduce the processing and assembly works as well as the thermal interference caused by the second thermistor against the first thermistor inserted in the tip portion of the metallic case.

The thermal interference is reduced by a plurality of uneven portions or a metallic unit formed in the shape of a coil provided on the outer surface of the tip portion of the metallic case in which the first thermistor is inserted as a thermal sensor. The heat generated by the second thermistor provided in a portion other than the tip portion of the metallic case is efficiently radiated into the cooling water from a relatively wider area of such a plurality of uneven portions or of the unit in the shape of a coil.

When the first and second thermistors provided in the thermal sensor of the present invention detect the temperatures of a cooling water, the first and the second thermistors respond more sensitively to a change in the temperature of the cooling water because the heat is more effectively received by a relatively wider area of a plurality of the uneven portions or of the unit in the shape of a coil formed on the tip portion of the metallic case.

BRIEF DESCRIPTION OF THE DRAWINGS

FIG. 6 is a drawing showing electrical circuit diagrams of the thermal sensor according to the present invention.

DESCRIPTION OF THE PREFERRED EMBODIMENTS

Figure 1:
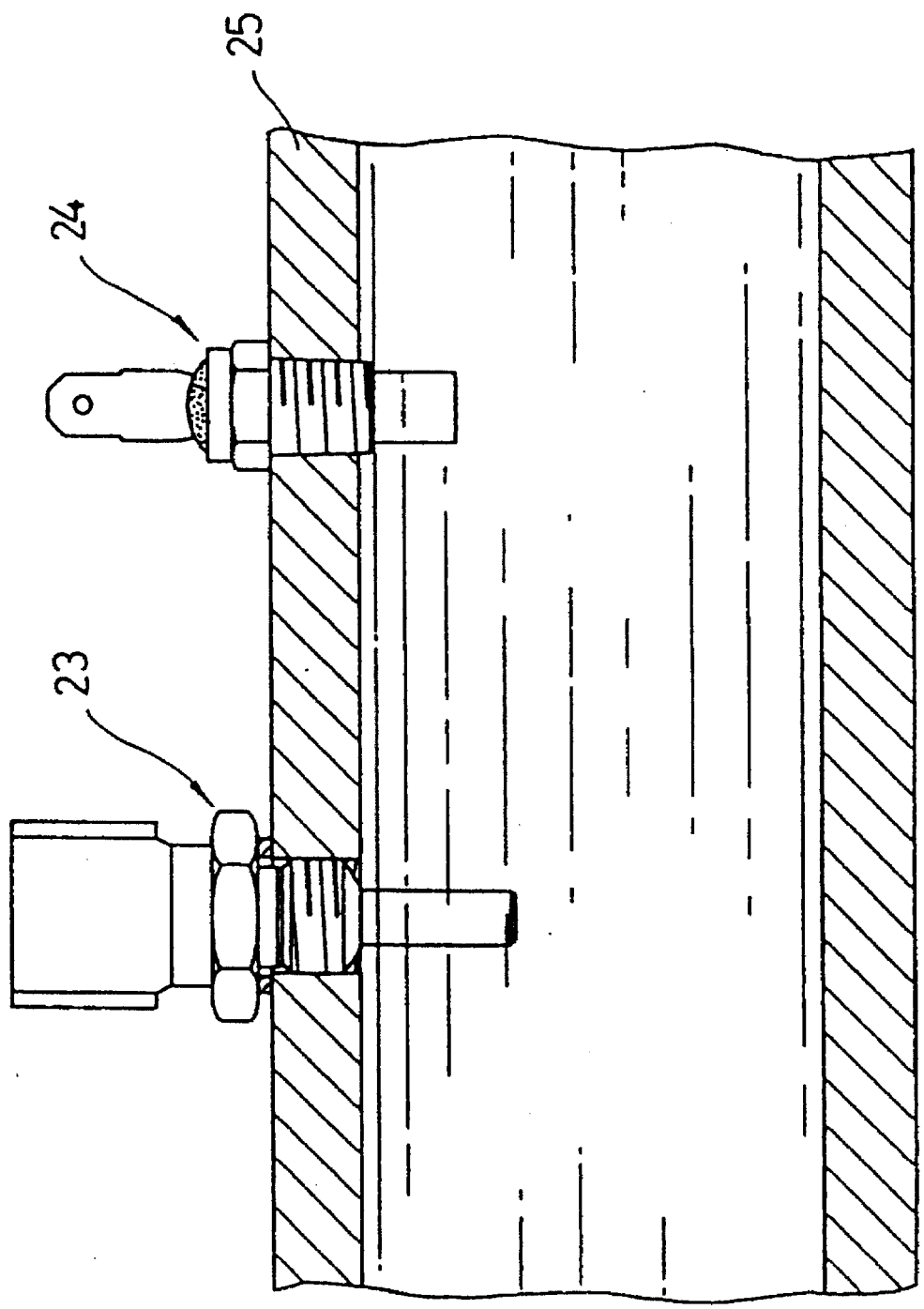
FIG. 1 is a drawing showing conventional thermal sensors each installed separately in a cooling water system of an engine.

The preferred embodiments of this invention are described hereunder by referring to the accompanying drawings.

As shown in the drawings, a plurality of uneven portions 4 are formed vertically or spially to the center axis of a metallic case 1 on an outer surface 3 of a tip portion 2 having a diameter smaller than that of the main body of the metallic case 1. A screw 5 is formed on an outer surface other than the tip portion 2 having such a smaller diameter for installation of the thermal sensor of this invention, for instance, on a cooling water system of an engine by means of a nut 6 formed on the base portion of the metallic case.

A hollow portion 7 having a step therein and an inner diameter made depending on the outer shape is further formed therein.

Figure 2:
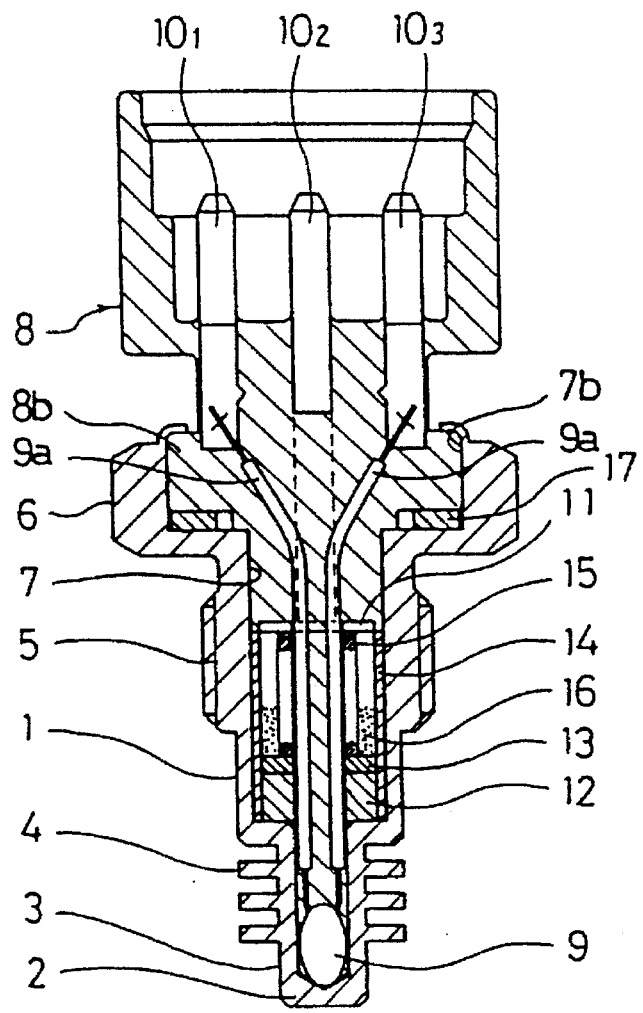
FIG. 2 is a sectional side drawing of the thermal sensor according to the present invention.
Figure 3:
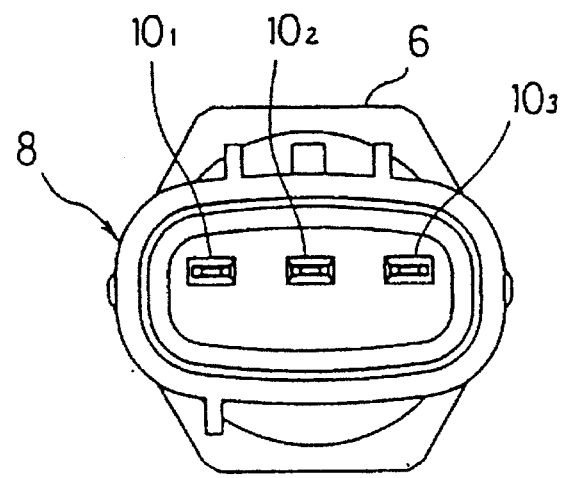
FIG. 3 is a plan drawing of the thermal sensor according to the present invention.
Figure 4:
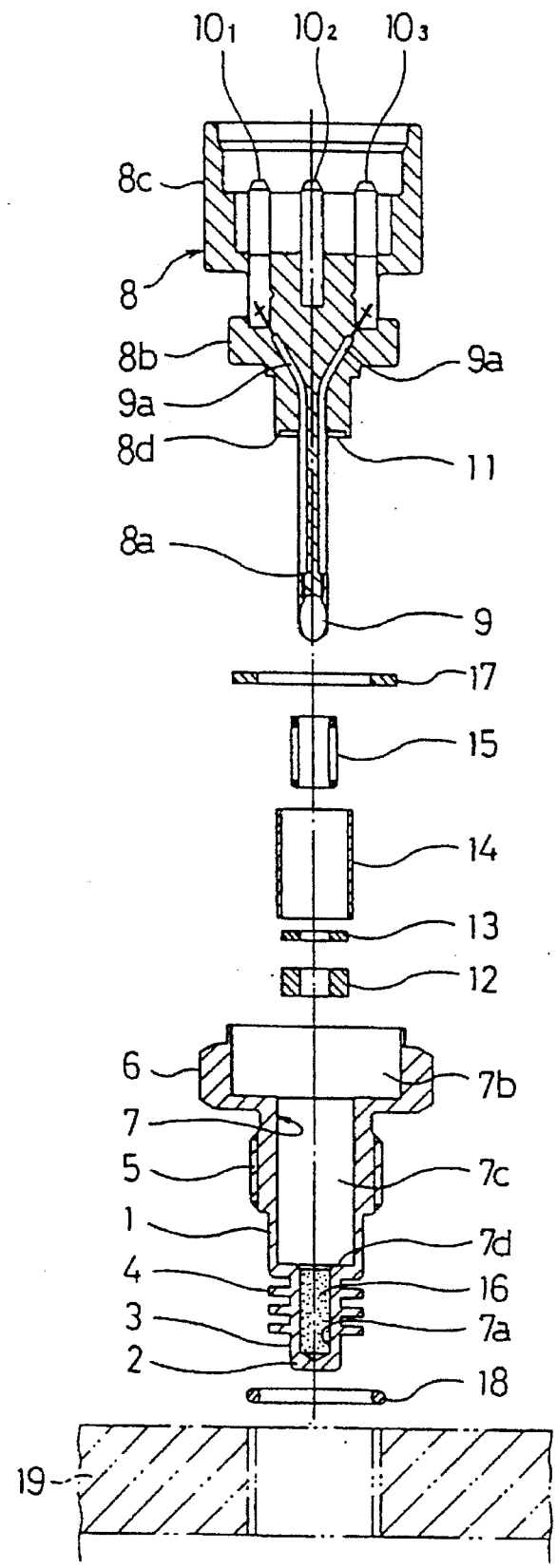
FIG. 4 is a breakup drawing of the thermal sensor according to the present invention.
Figure 5A:
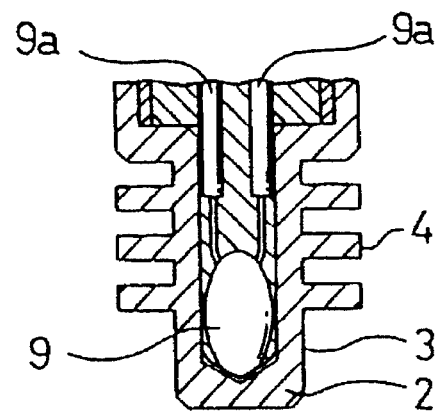
FIG. 5 is a drawing showing the preferred embodiments of uneven portions or a unit formed in the shape of a coil provided on the tip portion of a metallic case composing the thermalsensor according to the present invention.
Figure 5B:
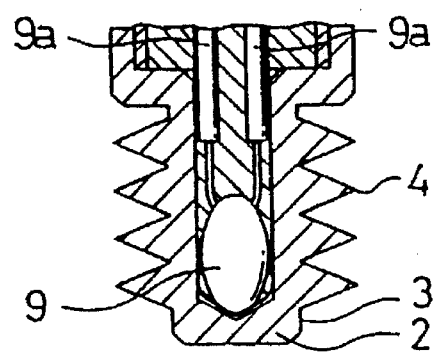

A sectional side shape of the uneven portion is a rectangular as shown in FIG. 2, FIG. 4 and FIG. 5(A) or a triangular as shown in FIG. 5(B).

Figure 5C:
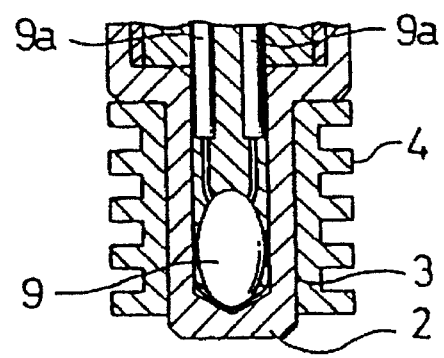
Figure 5D:
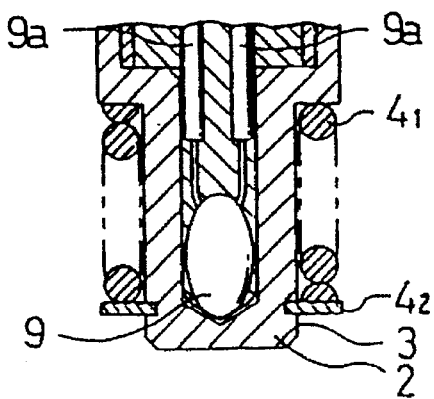

Alternatively, a plurality of uneven portions 4 are provided on a separate unit, as shown in FIG. 5(C), which couples with the outer surface 3 of the tip portion 2 having such a smaller diameter. As shown in FIG. 5(D), a separate coil $4_1$ or a separate unit similar to a coil is provided in contact with the outer surface 3 of the tip portion 2 of the metallic case 1 in place of the uneven portion. E washer $4_2$ is to hold the coil $4_1$ or the unit similar to the coil on the tip portion 2 of the metallic case 1.

FIG. 2 and FIG. 4 indicate an insulated holder 8 in which the first thermistor 9, for instance, as a thermal sensor for ECU is buried in a tip 8a which is inserted into a hollow portion 7a in the tip portion 2 of the metallic case 1.

A lead wire 9a of the first thermistor 9 is buried in the insulated holder 8 and a middle portion 8b of the insulated holder 8 is coupled with a hollow portion 7b in th nut 6 provided on the base portion of the metallic case 1 to connect electrode terminals $10_1$ and $10_3$ partially buried in a base portion 8c of the insulated holder 8 with the buried lead wire s 9a and 9a.

The other electrode terminal $10_2$ is connected with an electric contact 11 provided on a step 8d between the tip 8a and the middle portion 8b of the insulated holder 8.

FIG. 4 is a breakup drawing of the thermal sensor of the present invention and the composing units are described in the order of assembly as follows:

The second thermistor 12 of a doughnut shape is housed in a hollow portion 7c at the middle of the metallic case 1.

For instance, the second thermistor 12 as a thermal sensor for a water thermometer is housed in the metallic case 1 so as to bring the bottom surface of the electrode of the second thermistor into contact with the step 7d between the hollow portion 7a of the tip portion 2 of the metallic case 1 and the hollow portion 7c at the middle of the metallic case 1.

As shown in FIG. 4, an electrically conductive washer 13 is mounted, on the upper surface of the electrode of the second thermistor 12. An insulating sleeve 14 is to insulate the gaps between the thermistor 12, an electrically conductive washer 13, the outer surface of an electrically conductive spring 15 which is set forth hereunder and the inner surface of the hollow portion 7c of the metallic case 1. The electrically conductive spring 15 is housed in the insulating sleeve 14 and the tip portion 8a of the insulated holder 8 is inserted into the electrically conductive spring 15 which is put into the place between the electrically conductive washer 13 and an electrical contact 11 connected with the electrode terminal $10_2$.

An insulating silicon oil 16 is charged as a thermal conductor into the hollow portion 7a of the tip portion of the metallic case 1. Then, each unit is housed in the hollow portion 7c at the middle of the metallic case 1 and the middle portion 8b of the insulated holder 8 is coupled through a gasket 17 with the hollow portion 7b in the nut 6 provided on the base end of the metallic case 1. A gasket 18 is used to install the thermal sensor of this invention on a cooling water circuit 19 of an engine.

FIG. 6(A) is a drawing showing an electrical connection of the thermal sensor comprising the first thermistor 9 and the second thermistor 12 of the present invention. The lead wires 9a and 9a of the first thermistor 9 are connected with the electrode terminals $10_1$ and $10_3$ insulated from the metallic case 1. The one electrode surface of the second thermistor 12 is connected with the electrode terminal $10_2$ through the electrically conductive spring 15 and the other electrode surface is connected with the metallic case 1.

FIG. 6(B) is a drawing showing an electrical connection of the second thermistor 12, which is a thermal sensor for water thermometor, connected with a compass needle unit 20 of the water thermometer. The compass needle unit 20 is comprised of a coil 20a of resistance $R_1$, a coil $20_b$ of resistance $R_3$ and a compass needle $20_c$ connected as shown in the drawing.

A zener diode 21 is placed between a point "a" connecting the coil 20a with the coil 20b and a point "b" connecting the resistance $R_2$ with the second thermistor 12 having resistance $R_4$ to form a bridge circuit with which a battery 22 is connected as shown in the drawing. The first thermistor 9 inserted in the same metallic case for a ECU is connected through a resistance $R_5$ with the ECU circuit.

The action of the water thermometer is, as well known, such that while the temperature of the cooling water is low, the resistance of the second thermistor 12 stays high and the compass needle 20c of the compass needle unit 20 of the water thermometer swings down to the side of lower temperatures as indicated by a solid line in FIG. 6(C).

The compass needle 20c of the compass needle unit 20 of the water thermometer swings up toward the middle of the reading with a rise in the cooling water temperature, for instance, to 70°–100° C. as indicated by a dotted chain line in the FIG. 6(C). While the compass needle 20c stays in the middle of the reading, the compass needle 20c hardly swings due to the action of the zener diode 21 with a little change in the resistance of the second thermistor 12 caused by a little change in the temperature of the cooling water.

The resistance of the second thermistor 12 begins to decrease with a rise in the temperature of the cooling water and when the temperature exceeds, for instance, 120° C., the compass needle 20c of the compass needle unit 20 of the water thermometer swings to "H" on higher reading side as indicated by a dotted line in FIG. 5(C).

The electric current is flowing constantly in the second thermistor 12 provided as a thermal sensor for the water thermometer forming such a bridge circuit. Hence, a quantity of heat is generated. The thermal sensor of the present invention is comprised of a metallic case in the tip portion of which the first thermistor is inserted as a thermal sensor and a plurality of uneven portions or a metallic unit formed in the shape of a coil provided on the outer surface of the tip portion of the metallic case. Therefore, the heat generated at the second thermistor provided in a portion other than the tip of the metallic case can be effectively radiated into the cooling water through a plurality of the uneven portions or the unit in the shape of a coil having a wider surface area to reduce the thermal interference against the first thermistor inserted in the tip end of the metallic case.

In case the first and the second thermistors provided in the thermal sensor to detect the temperature of a cooling water, such a wider area is also available for receiving the heat from a plurality of the uneven portions or the metallic unit in the shape of coil to give a better response of the first and the second thermistors to a change in the temperatures of the cooling water.

A plurarity of uneven portions can be formed in the sectional side shape of rectangular or triangular in a monoblock with the tip portion of the metallic case.

Further, such a plurality of uneven portions can be formed as a separate metallic unit which can be coupled with the tip portion of the metallic case and hence the separate unit may be coupled with a tip portion of a metallic case of an existing thermal sensor to easily improve the thermal radiation of the existing thermal sensor and some of the metallic coils on the market maybe used for the application to further reduce the production cost of the thermal sensor of the present invention.

It is to be understand that this invention is not limited to the above description and the appended drawings, but rather various changes and modifications maybe made without departing from the spirit and scope of the present invention.

What is claimed is:

1. A thermal sensor comprising: a metallic case having a tip portion in which a first thermistor is inserted and a second thermistor is provided in a second portion other than the tip portion of the metallic case with a plurality of uneven portions provided on an outer surface of the tip portion thereof, wherein the plurality of uneven portions are formed on a separate metallic unit which is coupled with the tip portion of the metallic case.

2. The thermal sensor according to claim 1, wherein a sectional side shape of the uneven portion is rectangular.

3. The thermal sensor according to claim 1, wherein a sectional side shape of the uneven portion is triangular.

4. A thermal sensor comprising a metallic case having a tip portion of a diameter shorter than that of a main body of the metallic case with a plurality of uneven portions formed on the tip portion with a screw formed on an outer surface other than the tip portion of the metallic case to mount the thermal sensor by means of a nut provided on the base of the metallic case, an electrically insulated holder having a tip portion, a first thermistor buried in the tip portion of the insulated holder adapted to be inserted into the tip portion of the metallic case having a hollow portion with a step inside, a lead wire of the first thermistor buried in the insulated holder for wiring, a second thermistor provided in a portion other than the tip portion of the metallic case, wherein, a middle portion of the insulated holder is coupled with a base hollow of the metallic case and the buried lead wire is connected with electrode terminals partially buried in the base portion of the insulated holder and an electrically conductive spring connected with other electrode terminals is placed in an electrically insulated sleeve whereby one end of the electrically conductive spring is pushed to the second thermistor to make an electric and mechanical connection therewith and an electrically insulating but thermally conductive material is put into a plurality of gaps disposed between the metallic case, the first thermistor, the second thermistor and the electrically conductive spring.

5. The thermal sensor according to claim 4, wherein a sectional side shape of the uneven portion is triangular.

6. The thermal sensor according to claim 4, wherein the uneven portions are formed on a separate metallic unit which couples with the tip portion of the metallic case.

7. The thermal sensor according to claim 4, wherein the uneven portions are formed in the shape of a coil on a separate metallic unit which couples with the tip portion of the metallic case.

* * * * *